United States Patent
Schuster (12)

(10) Patent No.: US 6,823,889 B1
(45) Date of Patent: Nov. 30, 2004

(54) TOILET FILL VALVE WITH ADJUSTABLE BOWL FILL FLOW

(75) Inventor: Michael J. Schuster, Joliet, IL (US)

(73) Assignee: MJSI, Inc., Joliet, IL (US)

( * ) Notice: Subject to any disclaimer, the term of this patent is extended or adjusted under 35 U.S.C. 154(b) by 0 days.

(21) Appl. No.: 10/798,606

(22) Filed: Mar. 11, 2004

(51) Int. Cl.[7] .............................. E03D 1/32; E03D 1/33; F16K 21/18; F16K 31/24

(52) U.S. Cl. ............................... 137/441; 4/324; 4/415; 137/15.26; 137/436; 137/437

(58) Field of Search ........................... 4/324, 366, 415, 4/331; 137/434, 441, 442, 443, 444, 15.26, 432, 436, 437

(56) References Cited

U.S. PATENT DOCUMENTS

| | | | |
|---|---|---|---|
| 1,787,601 A | * | 1/1931 | Swanberg ................... 137/441 |
| 2,087,503 A | * | 7/1937 | Clemmons .................. 137/441 |
| 3,086,546 A | * | 4/1963 | Harold ........................ 137/441 |
| 3,172,128 A | * | 3/1965 | Ducey ......................... 137/444 |
| 3,744,064 A | * | 7/1973 | Preston ........................... 4/325 |
| 3,986,216 A | | 10/1976 | Davis et al. |
| 3,994,628 A | | 11/1976 | Kemper |
| 4,007,498 A | | 2/1977 | Pearson |
| 4,017,916 A | | 4/1977 | Pearson |
| 4,032,822 A | | 6/1977 | Un |
| 4,090,532 A | | 5/1978 | Story, Jr. |
| 4,145,775 A | | 3/1979 | Butler |
| 4,392,260 A | | 7/1983 | Bensen |
| 4,420,845 A | | 12/1983 | Antunez |
| 4,707,867 A | | 11/1987 | Kawabe et al. |
| 4,764,996 A | | 8/1988 | Pino |
| 4,793,588 A | | 12/1988 | Laverty, Jr. |
| 4,918,764 A | | 4/1990 | Haselswerdt et al. |
| 4,980,932 A | | 1/1991 | Stemples |
| 5,007,452 A | | 4/1991 | Antunez |
| 5,036,553 A | | 8/1991 | Sanderson |
| 5,052,060 A | | 10/1991 | Makita et al. |
| 5,134,729 A | | 8/1992 | Shaw |
| 5,228,152 A | * | 7/1993 | Fraley ............................ 4/664 |
| 5,245,710 A | | 9/1993 | Haselswerdt et al. |
| 5,362,026 A | | 11/1994 | Kobayashi et al. |
| 5,432,959 A | | 7/1995 | Ellsworth et al. |
| 5,469,586 A | | 11/1995 | Tsutsui et al. |
| 5,708,991 A | | 1/1998 | DeMarco |
| 5,715,860 A | | 2/1998 | Horad |
| 6,202,227 B1 | | 3/2001 | Gurowitz |
| 6,209,576 B1 | | 4/2001 | Davis |
| 6,219,856 B1 | * | 4/2001 | Alles ............................... 4/415 |
| 6,263,519 B1 | | 7/2001 | Parsons et al. |
| 6,385,788 B1 | * | 5/2002 | Wasielewski .................. 4/415 |
| 6,560,790 B2 | | 5/2003 | Saar et al. |
| 2002/0092090 A1 | | 7/2002 | Johnson |
| 2002/0162166 A1 | | 11/2002 | Saar et al. |

* cited by examiner

*Primary Examiner*—George L. Walton
(74) *Attorney, Agent, or Firm*—D'Aurelio & Mathews

(57) ABSTRACT

A toilet fill valve and methods are provided. In one embodiment, the toilet fill valve includes a water inlet and a first water outlet configured to supply water to a toilet tank. The toilet fill valve further includes a bowl fill valve having a bowl fill valve inlet and a bowl valve outlet, the bowl fill valve inlet being operatively coupled to the water inlet. The bowl fill valve is integrated with a body of the toilet fill valve. The bowl fill valve is configured to supply an adjustable flow of water out the bowl fill outlet for filling a toilet bowl during a flush cycle of a toilet.

10 Claims, 3 Drawing Sheets

TOILET FILL VALVE WITH ADJUSTABLE BOWL FILL FLOW

BACKGROUND

A toilet fill valve in a toilet typically includes a water outlet that provides water for refilling a toilet bowl during a flush cycle. Unfortunately, the water flowing out of such conventional water outlets to fill a toilet bowl provide much more water than is necessary to fill the average toilet bowl. Consequently, much of the water that flows into a toilet bowl during the average flush cycle is lost down the drain. This translates into a lost of millions of gallons of water each year.

BRIEF DESCRIPTION OF THE SEVERAL VIEWS OF THE DRAWINGS

The invention can be understood with reference to the following drawings. The components in the drawings are not necessarily to scale. Also, in the drawings like reference numerals designate corresponding parts throughout the several views.

DETAILED DESCRIPTION

Figure 1:
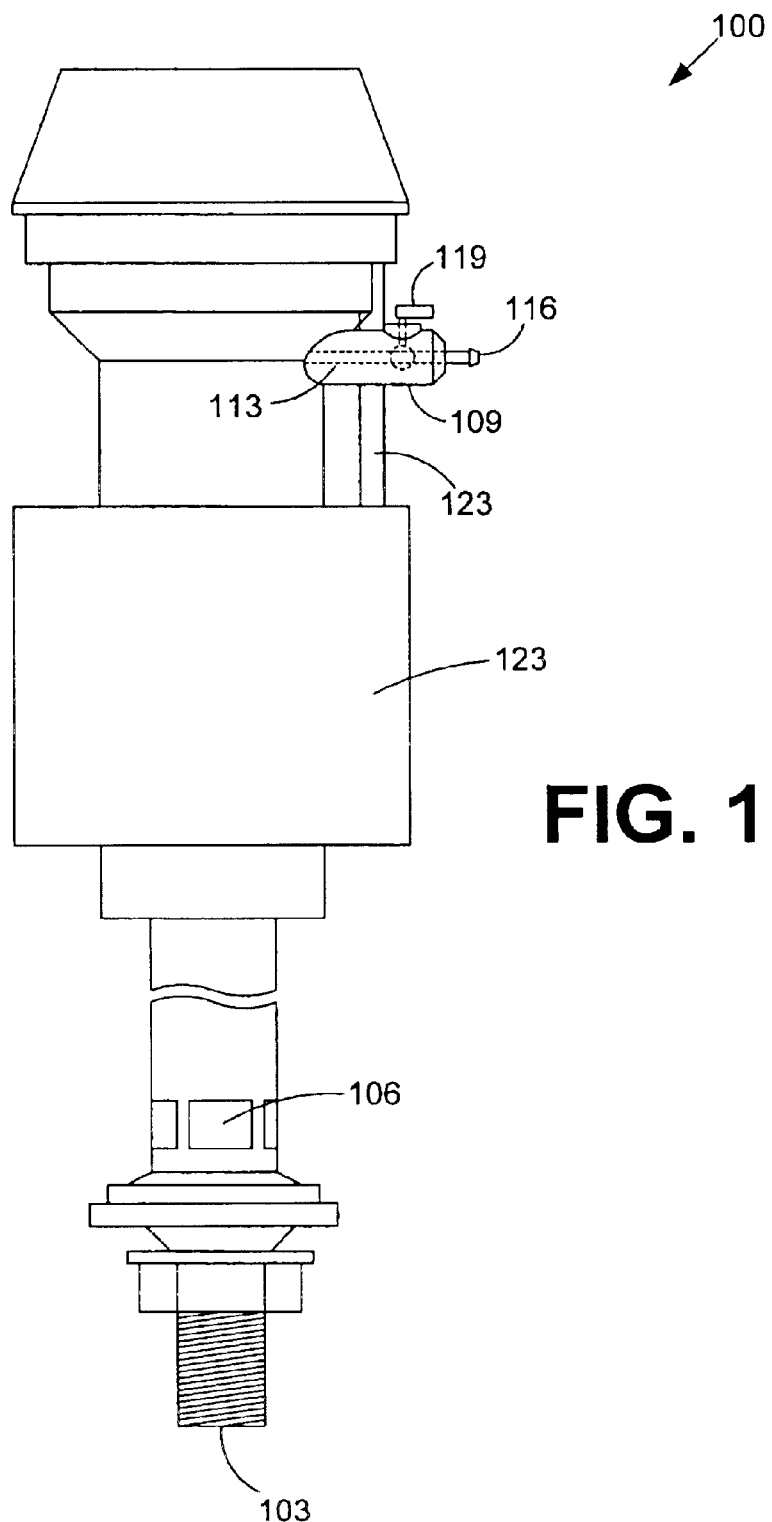
FIG. 1 is a drawing of a side view of a toilet fill valve according to an embodiment of the present invention.

With reference to FIG. 1, shown is a toilet fill valve 100 according to an embodiment of the present invention. The toilet fill valve 100 includes a water inlet 103 at the bottom of the toilet fill valve 100 that is configured to be coupled to a water source outside of a toilet tank within which the toilet fill valve 100 is installed. The toilet fill valve 100 includes one or more water outlets 106 that are configured to supply water into a toilet tank within which the toilet fill valve 100 is installed. The toilet fill valve 100 may be, for example, a pilot style fill valve. However, it is understood that the toilet fill valve 100 may be any style of fill valve such as, for example, a ballcock valve, etc. The toilet fill valve 100 also includes a bowl fill valve 109 according to an embodiment of the present invention. The bowl fill valve 109 includes a bowl fill valve inlet 113 and a bowl fill valve outlet 116. In addition, the bowl fill valve 109 includes a handle 119 that facilitates a manual adjustment of the bowl fill valve 109.

The bowl fill valve 109 is integral with the toilet fill valve 100. In this respect, the term "integral" refers to the fact that the bowl fill valve 109 and the toilet fill valve 100 comprise a single structure. In this respect, the bowl fill valve 109 may be included within the body of the toilet fill valve 100 as a portion of the toilet fill valve 100 in a single piece construction. Specifically, the bowl fill valve 109 may be molded as a portion of the toilet fill valve 100 or it may be snapped or clamped into place, or it may be attached to the toilet fill valve 100 in some other manner, etc.

Within the toilet fill valve 100, the bowl fill valve inlet 113 is operatively coupled to the water inlet 103. In this respect, when the toilet fill valve 100 is open and water flows from the water inlet 103 to the water outlets 106 and into the toilet tank, an amount of water is also supplied to the bowl fill valve inlet 113 that flows through the bowl fill valve 109 and out the bowl fill valve outlet 116. By virtue of the manual setting of the handle 119 of the bowl fill valve 109, the flow of water through the bowl fill valve 109 is regulated. In this manner, the flow of water is regulated so that enough water flows out of the bowl fill valve 109 to fill a toilet bowl without wasting any water down a drain.

Thus, the bowl fill valve 109 is configured to supply an adjustable flow of water out of the bowl fill outlet 116 that is directed to a toilet bowl during a flush cycle of a toilet to fill the toilet bowl. The flow of water is adjusted so that just enough flows out of bowl fill valve 109 so as to fill the toilet bowl without wasting any water.

The toilet fill valve 100 includes a float 123 that is operatively coupled to an actuating arm (not shown) by a translating stem 126. The float 123 floats on the water within a toilet tank and, depending on the location of the float 123 along the toilet fill valve 100, the toilet fill valve 100 is open or closed as can be appreciated by those with ordinary skill in the art. The bowl fill valve 109 and the actuating arm (not shown) are each located on the toilet fill valve 100 so as to prevent any interference between the bowl fill valve 109 and the translational stem 126 or the actuating arm as will be discussed.

According to an embodiment of the present invention, the bowl fill valve 109 may include a number of biased positions. In this respect, the movement of the handle 119 may cause the bowl fill valve 109 to move from one predefined biased position to other predefined biased positions. In this respect, various mechanisms such as tabs, snaps, or other position biasing structures may be employed. The biased positions of the bowl fill valve 109 help ensure that the bowl fill valve 109 remains in a given setting selected by a user by a manual manipulation of the handle 119 during the normal course of operation of the toilet fill valve 100. Thus, by virtue of the biased positions, the bowl fill valve 109 is prevented from moving out of a desired position set by a user over a long period of use due to vibration and other factors as can be appreciated by those with ordinary skill in the art.

The bowl fill valve 109 may be, for example, a ball valve, a gate valve, a globe valve, a plug valve, a diaphragm valve, a butterfly valve, a needle valve, a sliding gate, a quick turn valve, a knife valve or any other appropriate type of valve as can be appreciated by those with ordinary skill in the art.

To operate the toilet fill valve 100, the toilet fill valve 100 is first installed within a toilet tank. When a toilet is flushed and the tank is drained, the float 123 moves downward along the toilet fill valve 100 and, consequently, the toilet fill valve 100 opens to allow water to flow from the water inlet 103 and out the water outlets 106 into a toilet tank. At the same time, water flows into the bowl fill valve inlet 113 and out the bowl fill valve outlet 116 through the bowl fill valve 109. Based on the setting of the handle 119, the bowl fill valve 109 determines the precise flow rate of the water that flows out the bowl fill valve outlet 116. A tube is typically employed to direct the water flowing out the bowl fill valve outlet 116 to an overflow tube in the toilet tank. In this respect, the water flowing out the bowl fill valve outlet 116 refills the toilet bowl of the respective toilet.

Figure 2:
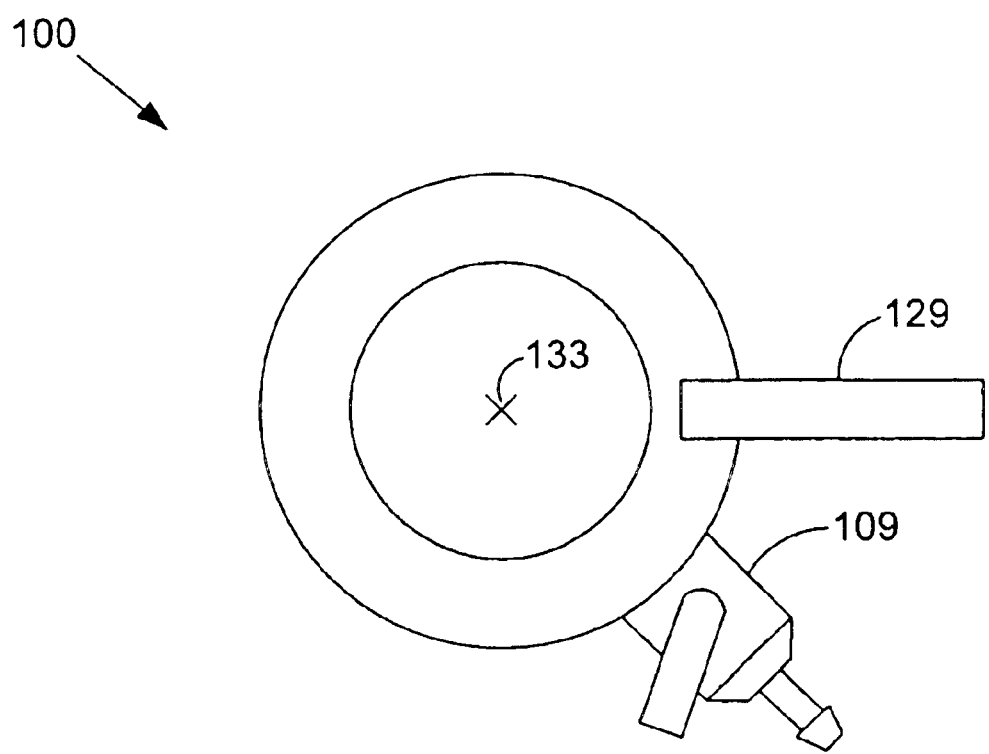
FIG. 2 is a drawing of a top view of the toilet fill valve of FIG. 1.

Referring next to FIG. 2, shown is a top view of the toilet fill valve 100 according to an embodiment of the present invention. In this respect, the actuating arm 129 of the bowl fill valve 100 is seen with respect to the bowl fill valve 109. The actuating arm 129 is coupled to the float by way of the translational stem 126 (FIG. 1). In this respect, the actuating arm 129 extends in an orthogonal direction relative to a longitudinal axis 133 of the toilet fill valve 100. The longitudinal axis 133 is centered in the toilet fill valve 100 along the length of the toilet fill valve 100. Also, the bowl fill valve 109 extends in an orthogonal direction relative to the longitudinal axis 133 of the toilet fill valve 100. In order to prevent interference between the bowl fill valve 109 and the translational stem 126 or the actuating arm 129, the actuating arm 129 is angularly offset relative to the bowl fill valve 109 as shown. In this respect, the translational stem 126 is coupled to the free end of the actuating arm 129. By virtue of the angular offset between the bowl fill valve 109 and the actuating arm 129, the operation of the bowl fill valve 109 does not interfere with the operation of the toilet fill valve 100 itself by virtue of the fact that the float 123 (FIG. 1) can move freely with the movement of the translational stem 126 in order for proper operation of the toilet fill valve 100.

Figure 3:
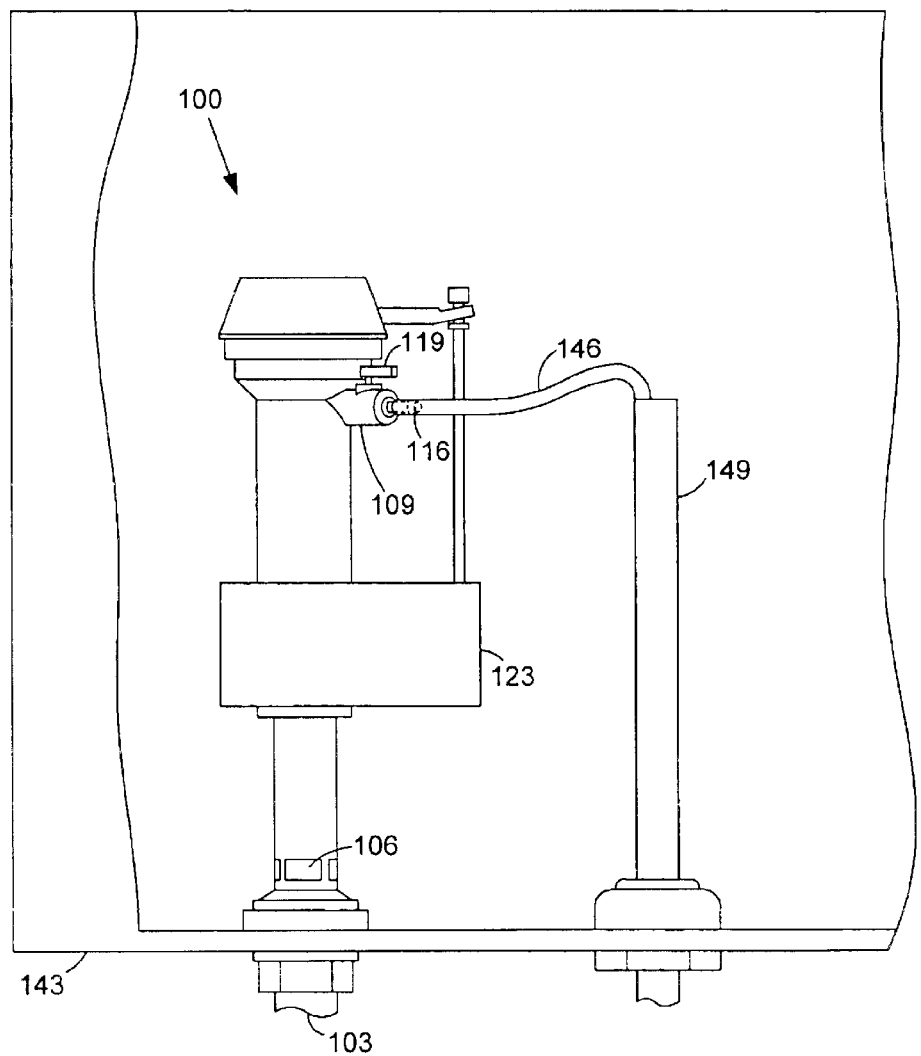
FIG. 3 is a drawing of a cutaway view of a toilet tank within which the toilet fill valve of FIG. 1 is installed.

With reference to FIG. 3, shown is the toilet fill valve 100 as installed within a toilet tank 143 according to an embodiment of the present invention. In this respect, the toilet fill valve 100 includes the water inlet 103 that is coupled to a water source outside of the toilet tank 143. The toilet fill valve 100 also includes one or more water outlets 106 that direct a flow of water into the toilet tank 143 during the operation of a flush cycle. The bowl fill valve 109 includes the bowl fill valve inlet (not shown) and the bowl fill valve outlet 116, where the bowl fill valve inlet is operatively coupled to the water inlet 103 as described above. Also, the bowl fill valve 109 is integrated with the body of the toilet fill valve 100 as described above.

A tube 146 is coupled to the bowl fill valve outlet 116 and is directed into the overflow tube 149 of the toilet tank 143. The tube 146 directs water that flows out of the bowl fill valve outlet 116 into the overflow tube 149 and refills the toilet bowl associated with the toilet tank 143 as can be appreciated by those with ordinary skill in the art. The bowl fill valve 109 is configured to supply the adjustable flow of water out the bowl fill valve outlet through the tube 146 and into the overflow tube 149 for filling the toilet bowl during the flush cycle of the toilet. In this respect, no pressure is seen within the tube 146. Specifically, the fact that the bowl fill valve 109 is integral with the toilet fill valve 100 prevents the creation of a pressure head in the tube 146 as would be the case if the bowl fill valve 109 were included in the middle of the tube 146. The fact that a pressure head is not created in any portion of the tube 146 prevents the tube 146 from working its way off of the bowl fill valve outlet 116 over time.

When installed, the bowl fill valve 109 is calibrated for the particular flush cycle of the toilet within which the toilet fill valve 100 is installed. To calibrate the bowl fill valve 109, a user first determines the water level in the toilet bowl when the toilet bowl is full of water. This gives the user a starting and an ending point for determining when the toilet bowl of the respective toilet is full. Next, the bowl fill valve handle 109 is adjusted so that the bowl fill valve 109 is placed in a predefined position that allows a predefined flow of water to refill the toilet bowl. In this manner, one adjusts the actual flow of water that refills the toilet bowl. Thereafter, the user flushes the toilet itself. Next, the user determines if the flow of water into the toilet bowl by virtue of the adjustments made to the bowl fill valve 109 is adequate to refill the toilet bowl during the flush cycle. This may be determined, by identifying whether the level of the water in the toilet bowl reaches the full level determined at the beginning of the bowl fill valve calibration above.

The flow of water from the bowl fill valve 109 should be set so as to ensure that the water level in the toilet bowl reaches the full level at about the same time that the flush cycle ends. In other words, the level of water in the toilet bowl should reach its highest level at the same time that the flush cycle ends. This prevents any water from being lost down the drain associated with the toilet.

If the amount of water that flows into the toilet bowl is inadequate to refill the toilet bowl during the flush cycle as described above, then one should repeat the steps of adjusting the bowl fill valve, flushing the toilet, and then once again determining if the flow of water into the toilet bowl is adequate to refill the toilet bowl during a flush cycle.

Ultimately, during use of the toilet that includes the toilet fill valve 100 and the toilet tank 143, a user flushes the toilet and a predetermined flow of water exits the bowl fill valve outlet 116 and is directed into the toilet bowl. After the toilet tank has drained during the flush cycle, a flapper closes in the toilet tank and the toilet tank refills. During the refilling of the tank, the water supplied by the bowl fill valve 109 fills the toilet bowl itself. The amount of water supplied by the bowl fill valve in the time it takes to refill the toilet tank should be approximately equal to the amount of water needed to fill the toilet bowl. By virtue of the fact that the bowl fill valve 100 is integrated within the toilet fill valve 100, a pressure head is prevented from being created due to any potential pinching of the tube 146 or other similar adjustment mechanism.

Although the invention is shown and described with respect to certain embodiments, it is obvious that equivalents and modifications will occur to others skilled in the art upon the reading and understanding of the specification. The present invention includes all such equivalents and modifications, and is limited only by the scope of the claims.

What is claimed is:

1. A toilet fill valve, comprising:

a water inlet;

a first water outlet configured to supply water to a toilet tank; and a bowl fill valve having a bowl fill valve inlet and a bowl fill valve outlet, the bowl fill valve inlet being operatively coupled to the water inlet, the bowl fill valve being integrally molded with and radially extending from a portion of a body of the toilet fill valve, and the bowl fill valve being configured to supply an adjustable flow of water out the bowl fill outlet for filling a toilet bowl during a flush cycle of a toilet.

2. The toilet fill valve of claim 1, further comprising:

an actuating arm coupled to a float, the actuating arm extending in an orthogonal direction relative to a longitudinal axis of the toilet fill valve; and the bowl fill valve extending in an orthogonal direction relative to the longitudinal axis of the toilet fill valve, wherein the actuating arm is angularly offset relative to the bowl fill valve, thereby preventing an interference with the bowl fill valve and a translational stem extending from the float to a free end of the actuating arm.

3. The toilet fill valve of claim 1, wherein the bowl fill valve further comprises a number of biased positions.

4. The toilet fill valve of claim 1, wherein the bowl fill valve is a type of valve selected from the group consisting of a ball valve, a gate valve, a globe valve, a plug valve, a diaphragm valve, a butterfly valve, a needle valve, a sliding gate, a quick turn valve, and a knife valve.

5. The toilet fill valve of claim 1, wherein the bowl fill valve is a ball valve.

6. The toilet fill valve of claim 1, wherein the bowl fill valve is a butterfly valve.

7. The toilet fill valve of claim 1, wherein the bowl fill valve is a needle valve.

8. A toilet tank with an adjustable bowl fill water flow, comprising:
- a toilet fill valve having a water inlet coupled to a water source outside of the toilet tank and a water outlet directing an flow of water into the toilet tank;
- a bowl fill valve having a bowl fill valve inlet and a bowl fill valve outlet, the bowl fill valve inlet being operatively coupled to the water inlet, the bowl fill valve being integrally molded with and radially extending from a portion of a body of the toilet fill valve;
- a tube coupling the bowl fill valve outlet to an overflow tube of the toilet tank, wherein a flow of water into the overflow tube is directed to a toilet bowl; and
- the bowl fill valve being configured to supply an adjustable flow of water out the bowl fill outlet through the tube and into the overflow tube for filling the toilet bowl during a flush cycle of a toilet, the bowl fill valve preventing a creation of a pressure head in the tube.

9. A method for adjusting a bowl fill water flow during a flush cycle in a toilet, comprising the steps of:
- determining a water level in a toilet bowl when the toilet bowl is full of water;
- adjusting a bowl fill valve integrally molded with and radially extending from a portion of a toilet fill valve in the toilet to a predefined position, thereby adjusting a flow of water that refills the toilet;
- flushing the toilet;
- determining if the flow of water into the toilet bowl is adequate to refill the toilet bowl during the flush cycle; and
- repeating the steps of adjusting the bowl fill valve, flushing the toilet, and determining if the flow of water into the bowl is adequate to refill the toilet bowl until the toilet bowl is substantially filled during a flush cycle.

10. The toilet fill valve of claim 9, further comprising preventing a creation of a pressure head in a tube that is coupled between an outlet of the bowl fill valve and an overflow tube in the toilet by adjusting the bowl fill valve.

* * * * *

UNITED STATES PATENT AND TRADEMARK OFFICE
CERTIFICATE OF CORRECTION

PATENT NO. : 6,823,889 B1
DATED : November 30, 2004
INVENTOR(S) : Michael J. Schuster It is certified that error appears in the above-identified patent and that said Letters Patent is hereby corrected as shown below:

<u>Column 10,</u>
Line 15, please replace claim 10 as follows:
-- 10. The method of claim 9, further comprising preventing a creation of a pressure head in a tube that is coupled between an outlet of the bowl fill valve and an overflow tube in the toilet by integrating the bowl fill valve with a portion of the toilet fill valve. --.

Signed and Sealed this

Eleventh Day of October, 2005

JON W. DUDAS
*Director of the United States Patent and Trademark Office*